United States Patent [19]

Danjyo et al.

[11] 4,261,752

[45] Apr. 14, 1981

[54] GUNNING REFRACTORIES

[75] Inventors: Hiroyuki Danjyo, Bizen; Eiichi Yorita, Okayama; Shojiro Sawada, Sakai; Fumiyoshi Hashimoto, Nishinomiya, all of Japan

[73] Assignee: Shinagawa Refractories Co., Ltd., Tokyo, Japan

[21] Appl. No.: 39,142

[22] Filed: May 15, 1979

[30] Foreign Application Priority Data

May 29, 1978 [JP] Japan .................................. 53/64051

[51] Int. Cl.$^3$ ............................................. C04B 35/04
[52] U.S. Cl. ....................................... 106/55; 106/56; 106/58; 106/63
[58] Field of Search ................. 106/56, 281 R, 58, 63, 106/55

[56] References Cited

U.S. PATENT DOCUMENTS

| | | | |
|---|---|---|---|
| 3,436,237 | 4/1969 | Crookston et al. | 106/56 |
| 3,468,683 | 9/1969 | Montgomery | 106/56 |

*Primary Examiner*—James Poer
*Attorney, Agent, or Firm*—Larson, Taylor and Hinds

[57] ABSTRACT

A gunning refractory of the mean particle diameter in the range 1–10 mm, characterized in that a molten liquid of pitch having softening point higher than 100° C. is mixed with refractory inorganic fine particles where the proportion to the total weight is in the range 5–85% by weight, and thereafter the mixture is hardened.

5 Claims, No Drawings

GUNNING REFRACTORIES

This invention relates to gunning refractories for use in reinforcing and/or repairing a steel making furnace such as converter or electric furnace or a ladle, and particularly to the gunning refractories suitable for hot gunning a converter.

Recently operation conditions of various kinds of industrial furnaces have become severe much more because of large-sizing furnace, charging of additives, large output operation, etc.

The effectuation of the operation conditions is determined by the properties of the built refractory industrial furnace, but as one method of prolonging the endurable life and increasing operation efficiency there is effectively used a convenient method of reinforcing and/or repairing an operating furnace by hot gunning refractories to the portions likely to damage or the portions already damaged.

Preferably, gunning refractories produce a high sintering strength after they have been gunned to the damaged portions and said refractories have a proper viscosity and less rebound loss when they are gunned.

The object of the invention is to provide gunning refractories having said desirable properties, and the subject matter of the invention resides in gunning refractories having average particle diameter 1-10 mm, in which a molten liquid of pitch having softening point higher than 100° C. is mixed with refractory inorganic fine particles where the ratio to the whole weight is on the range 5-85% by weight, and thereafter the mixture is solidified.

The invention will now be described in detail.

Either of the petroleum pitch and the coal pitch will do as the pitch material of the refractories according to the invention, but the importance is that the pitch to be used has the softening point higher than 100° C. and preferably higher than 120° C. The refractories made of the pitch material having softening point lower than 100° C. are likely to melt in a short time due to furnace heat, so that in such a place as furnace wall of impaired portion there is caused a disadvantage that the refractories run down before sintering. Further, the refractory materials of the invention are used generally in mixture with an aggregate as described hereinafter, but the mixing operation in such a case has a tendency of becoming difficult because of the adherence of said refractories.

As regards the refractory inorganic fine particles, which are other material of the refractories of the present invention, those of less thermal expansion and contraction will answer the purpose and they will not be limited to any special particles. For example there can be mentioned fired clay, blast furnace cinders, fly ash, dolomite clinker, magnesia clinker, etc. but dolomite clinker and magnesia clinker may be preferably adopted as said material. These inorganic fine particles are used in one kind or in mixture of more than two kinds. The refractory inorganic fine particles are employed normally in the mean particle diameter of 35-325 mesh. In this case it is preferable to use particles in different particle diameters from view of the sintering strength, and particularly it is preferable to employ them in the proportion of 40-50% by weight particles of less than 35 mesh and more than 150 mesh, 20-50% by weight particles of less than 150 mesh but more than 325 mesh, and 10-30% by weight of less than 325 mesh.

In the refractories of the invention the molten liquid of said pitch is mixed with said refractory inorganic fine particles, the mixture is solidified and adjusted to refractories of specific particle diameter. In this case, however, it is required that the mixing ratio of the refractory inorganic fine particles to the total weight of the pitch and inorganic fine particles is in the range 5-85% by weight and preferably in the range 40-60% by weight, and that the mean particle diameter of said refractories are controlled in the range 1-10 mm and preferably in the range 3-7 mm. In order that the gunning material is of less rebound loss it is in sufficient only that the gunning material contains a viscosity-producing material as component, and in the case of gunning the refractories by injector it is required that the refractories are provided with a suitable mass such as colliding against the repairing wall at a sufficient speed in less rebound range. However, the inventor of the invention has found in studies that by selecting the mixing ratio of said refractory inorganic fine particles from among said ranges and controlling the average particle diameter of the refractories themselves, the above conditions are satisfied and it is possible to obtain excellent gunning refractories having less rebound loss.

As the concrete method of manufacturing the refractories according to the invention there can be suitable adopted a method in which a molten liquid of pitch is added and mixed with a predetermined amount of the refractory inorganic fine particles, and the obtained mixture is dropped down into the water through a dispersing plate having proper opening diameter whereby the mixture is hardened, or a method in which said mixture is hardened to a flake form of suitable thickness thereafter being broken, and the particles of predetermined mean particle diameter are recovered by sieving treatment.

The gunning refractories according to the invention can be used alone, but generally they are employed as a mixture with aggregate. The aggregate may not be limited to any specific kind and it is capable of using those which are conventionally used as aggregate of gunning refractories, as they are. For example, preferably there are employed the refractory inorganic fine particles which are one component of the refractories of this invention, and particularly the particles of dolomite clinker or magnesia clinker. The using ratio of said aggregate is chosen from the range 0.5-5 times by weight to the refractories of the invention, and preferably from the range 1-3 times by weight. Aggregate of less than 10 mm in the average particle diameter is normally used, but in this case the use in combination of different diameter particles may preferably increase the sintering strength much more. Particularly, the particles of 1-10 mm and preferably 3-7 mm are 30-70% by weight and the reminder is of less than 28 mesh.

The gunning refractories of the invention are gunned to the portions likely to damage or the portions already damaged according to conventional known method which uses injector, but the refractories of the invention and the gunning material where said refractories are mixed with an aggregate are of minor amount in rebound loss.

Further, the refractories according to the invention are suitable particularly for hot gunning but they can also be used as cold gunning ones with the use of binder such as water glass.

The following examples illustrate the present invention further in detail but not to be construed as limiting the scope of the invention.

EXAMPLE 1

One part by weight of the molten liquid (240° C.) of pitch where the softening point is 120° C. was added and mixed with 1.2 parts by weight of dolomite fine particles (which consist of 45% by weight of 35–150 mesh particles, 35% by weight of 150–325 mesh particles and 20% by weight of less than 325 mesh particles). The obtained mixture was dropped down, under stirring, into water through dispersing plate having 5 mm opening diameter thereby obtaining the gunning refractories of the invention. Said refractories were gunned to a vertically standing 1200° C. panel at a position 1.0 m away according to conventionally known method. The adhesive ratio measured at that time was approximately 90%.

By comparison, a similar text was carried out for the conventional product (gunning material consisting of 60% by weight of 6–20 mesh magnesia clinker, 40% by weight of less than 48 mesh magnesia clinker, 4.5% by weight in outer percentage of phosphate binder fine powder, and 3.0% by weight in outer percentage of lime fine powder. The adhesive ratio of said product as measured was found to be in the range 80–85%.

Further, a refractory of 0.5 mm in average particle diameter was prepared according to said Example 1, when the adhesive ratio as measured was in the range 75–80%.

EXAMPLE 2

Again a similar test as in Example 1 was carried out for a mixture of 3 parts by weight of said refractories according to the invention, which was used in Example 1, and 7 parts by weight of dolomite clinker (which consists of 30% by weight of coarse particles in 0.5–3 mm particle diameter, and 70% by weight of fine particles in less than 0.3 mm particle diameter). The adhesive ratio of the mixture thus obtained was about 90%.

What is claimed is:

1. A gunning refractory comprising a plurality of discrete particles having a diameter in the range of 1 to 10 mm, said particles comprising fine inorganic refractory particles in admixture with pitch having a softening point higher than 100° C., the amount of said fine inorganic refractory particles being in the range of 5 to 85% by weight of the total weight of the fine inorganic refractory particles and pitch.

2. A gunning refractory according to claim 1 wherein the amount of said fine inorganic refractory particles is in the range of 40–60% by weight.

3. A gunning refractory according to claim 2 wherein the mean particle diameter of said fine inorganic refractory particles is in the range of 35 to 325 mesh.

4. A gunning refractory according to claim 3 wherein said fine inorganic refractory particles have the following particle size distribution:

| | |
|---|---|
| less than 35 mesh and more than 15 mesh: | 40–50% by weight |
| less than 150 mesh and more than 325 mesh: | 20–50% by weight |
| less than 325 mesh: | 10–30% by weight |

5. A gunning refractory according to claim 4 wherein said fine inorganic refractory particles are selected from the group consisting of dolomite clinker particles, magnesia clinker particles, or mixtures thereof.

* * * * *